United States Patent Office 3,210,064
Patented Oct. 5, 1965

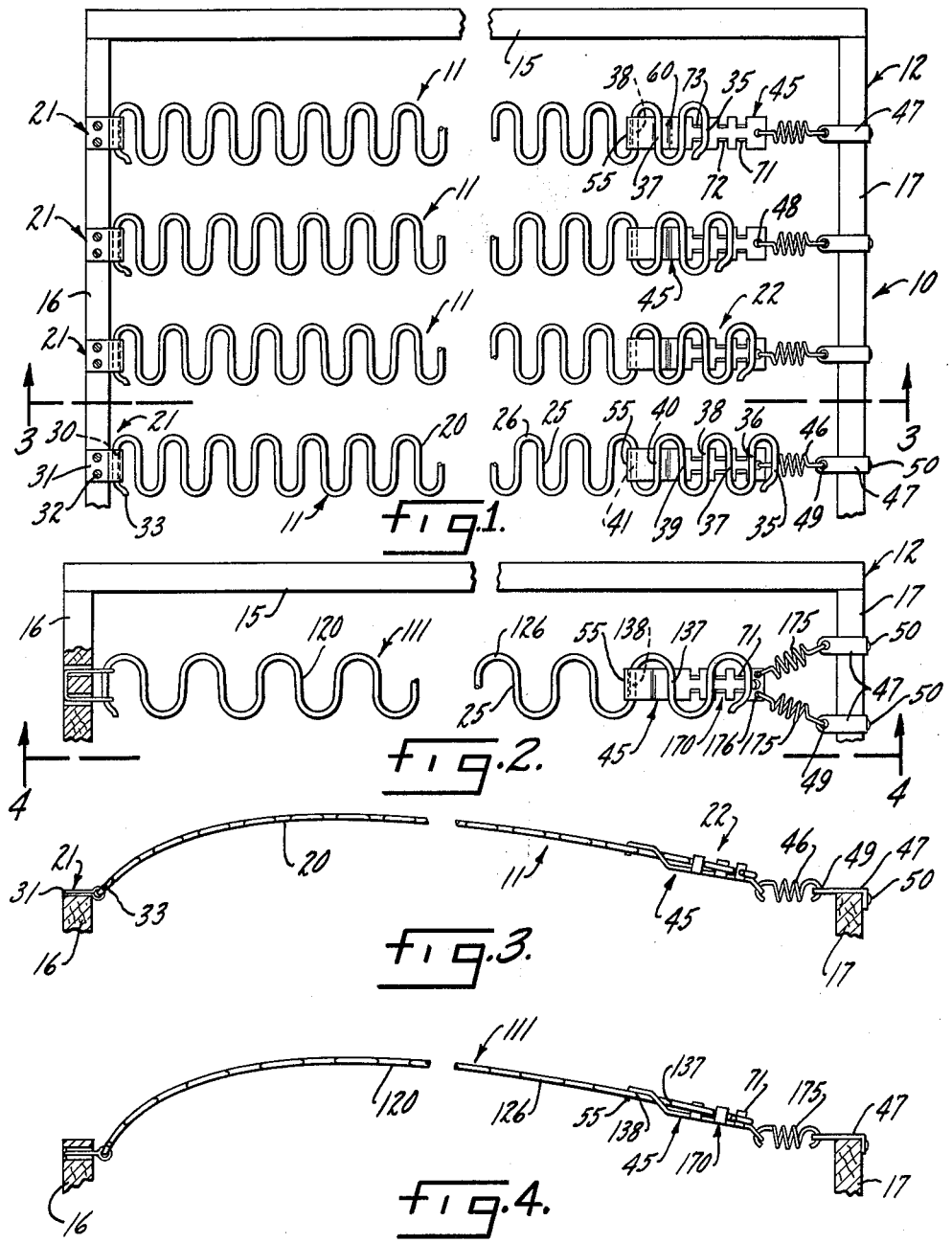

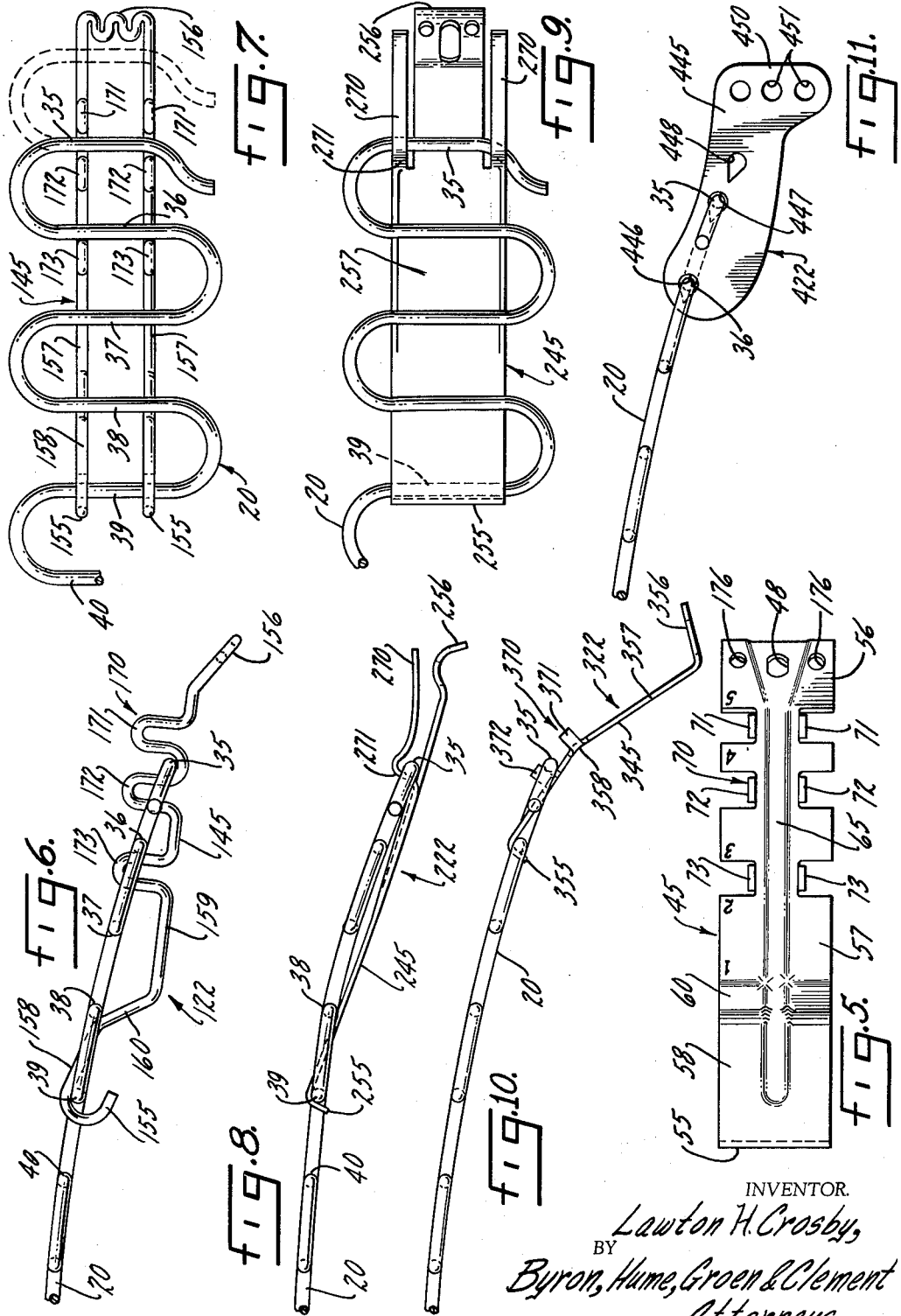

3,210,064
SPRING CONSTRUCTION
Lawton H. Crosby, Lake Bluff, Ill., assignor to Morley Furniture Corporation, Chicago, Ill., a corporation of Illinois
Filed Oct. 7, 1963, Ser. No. 314,348
16 Claims. (Cl. 267—103)

This invention relates in general to furniture and other seating constructions, and more particularly to a spring arrangement for spring supported seating constructions and the like.

It is an object of the present invention to provide a new and improved spring arrangement for use in furniture or the like.

It is another object to provide a new and improved spring arrangement utilizing a sinuous spring band.

It is still another object to provide a sinuous spring band arrangement which is readily adjustable on either the sprung-up frame or on the finished upholstered piece to establish the precise spring effect desired.

It is yet another object to provide a sinuous spring band arrangement which assures superior quality seating results while requiring relatively thinner and less expensive cushioning and decking materials than with other spring constructions.

It is a further object to provide a sinuous spring band arrangement which assures substantially uniform resiliency over the entire length of the spring band and incorporates a built-in rearward pitch on a uniform-height furniture frame, eliminating the need and cost to build pitch into the frame.

It is yet a further object to provide a sinuous spring band arrangement which, because of its reduced spring strain, facilitates the use of lighter wood constructions in furniture frames.

It is still a further object to provide a sinuous spring band arrangement which obviates "bucketing" depression of the spring band.

It is another object to provide a sinuous spring band arrangement incorporating a new and improved torque arm arrangement.

It is still another object to provide a torque arm arrangement of the aforedescribed character which imparts lateral stability to the spring band arrangement.

It is a further object to provide a torque arm arrangement which is readily adaptable to utilization with various types of sinuous springs, including standard loop, expanded loop, and super loop, for example, without special modification of the springs.

It is still a further object to provide a torque arm arrangement which facilitates the use of standard de-arc springs while attaining spring action which is substantially the equal of that normally attained with standard arc springs.

It is yet a further object to provide a spring band and torque arm arrangement of the aforedescribed character which is simple in construction and easily and inexpensively manufactured and assembled.

The foregoing and other objects are realized in accord with the present invention by providing an improved sinuous spring band arrangement, including a new and improved torque arm arrangement, for use in spring constructions of furniture or the like. The spring band arrangement embodying features of the present invention affords "deep drop" spring action which maintains positive control of the support provided by the sinuous spring bands as they bend under load. The torque arm arrangement of the present invention is readily secured to a conventional, unmodified sinuous spring band in one of several pre-selected positions to afford differential leverage controlled springing for a particular cushion, for example. In other words, the manufacturer can readily adjust and control the type and final feel of the spring effect; all without varying the construction of the standard sinuous bands utilized. Furthermore, a torque arm arrangement embodying features of the present invention is readily adaptable to virtually every known sinuous spring band construction, including standard loop spring bands, expanded loop and super-loop bands.

In accord with the present invention, a torque arm arrangement is readily secured to the regular-style end of a sinuous spring band without the necessity of a Z-hook being formed thereon. Furthermore, a flat connection between the torque arm arrangement and the spring band is defined preventing unsightly and even dangerously abrading protrusions in the upholstery. In addition, the connection between the torque arm arrangement, embodying features of the present invention, and the spring band is effected over a predetermined substantial length of a spring band. This arrangement distributes both torque stresses and longitudinal attachment stresses, prolonging the life of the spring arrangement as a whole.

Several forms of the torque arm arrangement embodying features of the present invention are hereinafter illustrated and described. Each embodies the adjustable controlled-stressing and other features of the present invention which, in one way or another, enhance the spring characteristics of various types of sinuous spring bands which normally comprise the cushion support in an upholstered chair or the like.

The arrangement embodying features of the present invention, both as to construction and method of operation, taken with further objects and advantages thereof, will best be understood by reference to the following description taken in conjunction with the accompanying drawings, in which:

FIGURE 1 is a plan view of a portion of a furniture spring assembly illustrating a first embodiment of the spring band and torque arm arrangement according to the present invention, in various stages of adjustment;

FIGURE 2 is a plan view of a portion of a furniture spring assembly utilizing the torque arm arrangement illustrated in FIGURE 1, with a different type of spring band and band mounting;

FIGURE 3 is a sectional view taken along line 3—3 of FIGURE 1;

FIGURE 4 is a sectional view taken along line 4—4 of FIGURE 2;

FIGURE 5 is an enlarged plan view of the torque bar illustrated in FIGURES 1-4;

FIGURE 6 is an enlarged side elevational view of a portion of a second embodiment of torque arm arrangement according to the present invention;

FIGURE 7 is an enlarged plan view of the torque arm arrangement illustrated in FIGURE 6;

FIGURE 8 is an enlarged side-elevational view of a portion of a third embodiment of torque arm arrangement according to the present invention;

FIGURE 9 is an enlarged plan view of the torque arm arrangement illustrated in FIGURE 8;

FIGURE 10 is an enlarged side-elevational view of a portion of a fourth embodiment of torque arm arrangement according to the present invention; and FIGURE 11 is an enlarged side-elevational view of a portion of a fifth embodiment of torque arm arrangement according to the present invention.

Referring now to the drawings, and particularly to FIGURE 1, a portion of a furniture spring assembly is shown generally at 10. The furniture spring assembly 10 comprises a series of sinuous spring band arrangements 11 defining features of the first embodiment of the present invention, mounted in a frame 12. The frame 12 includes a pair of side rails 15 (only one of which is shown) a front rail 16, and a back rail 17. The rails 15–17 are, in accord with the present invention, substantially identical in construction and preferably composed of 4/4 or 5/4 lumber. It is a feature of the present invention that lighter lumber, the 4/4 lumber for example, is readily utilized where 5/4 lumber might heretofore have been considered necessary.

Each of the sinuous spring band arrangements 11 is identical in construction. Accordingly, only one will be described in substantial detail. It should be noted in FIGURE 1, however, that each spring band arrangement 11 is mounted slightly differently in the frame 12. This is merely an exemplary arrangement to illustrate the wide range of adjustability which is a feature of the present invention. Ordinarily, of course, each spring band arrangement 11 is mounted identically in the frame 12.

Referring to FIGURES 1 and 3, it will be seen that each spring band arrangement 11 includes a sinuous spring band 20 secured at one end to the front rail 16 of the framework 12 by a U strap assembly 21, and at the other end to the rear rail 17 through a torque arm arrangement 22 defining features of the first embodiment of the present invention. According to the present invention the torque arm arrangement 22 imparts substantial torque to the sinuous spring band 20 over a considerable portion of the rear end of the spring band, up to as many as seven segments, causing the spring band 20 to assume the differentially-arced, controlled-stress, unloaded relationship seen in FIGURE 3. When loaded, each sinuous spring band arrangement 11 provides what is referred to as "deep drop" support of the person seated on the furniture; that is, support without collapsing or "bucketing" of the spring arrangements 11.

Additional significant features of the present invention reside in the adjustability of the spring arrangement 11 as facilitated by the torque arm arrangement 22, which can be joined to the sinuous spring band 20 in varying relationships, as seen in FIGURE 1. Accordingly, a varying amount of controlled-stressing can selectively be established in the sinuous spring band arrangements 11, dependent upon the ultimate use for which the spring assembly 10 is to be utilized.

The sinuous spring bands 20 illustrated in FIGURES 1 and 3 are standard arced spring bands used in the manufacture of much of today's furniture. The spring bands 20 are composed of a series of linear segments, broadly identified by the reference numeral 25, inter-connected by alternating (on opposite sides) semi-circular segments 26.

Adjacent the front rail 16 of the frame 12, the forwardmost linear segment 30 of each sinuous spring band 20 is attached to the front rail 16 by the U strap assembly 21, as has been pointed out. In this light, the U strap assembly 21 includes a U strap 31 which encircles the linear segment 30 and is secured to the top of the front rail 16 by conventional wood nails 32 or the like. The forwardmost linear segment 30 is preferably bent inwardly at its free extremity 33 to prevent the spring band 20 from slipping out of the U strap 31.

Adjacent the back rail 17 of the frame 12, the torque arm arrangement 22 cooperates with the sinuous spring band 20 to attach the spring band to the back rail 17 and provide the torque-controlled springing desired, a differential amount of springing being selectively available, as has been pointed out. The torque arm arrangement 22 co-operates with one or more of the first linear segment 35, the second linear segment 36, the third linear segment 37, the fourth linear segment 38, the fifth linear segment 39, the sixth linear segment 40, and the seventh linear segment 41, depending upon the manner in which adjustment of the torque arm arrangement 22 is made according to the present invention. FIGURE 1 illustrates the various ways in which the torque arm arrangement 22 according to the first embodiment of the present invention might be adjusted.

The torque arm arrangement 22 includes a torque bar 45 which cooperates with various of the linear segments 35–41 in the sinuous spring band 20, depending upon its adjusted position, to secure the spring band 20 to the back rail 17 of the frame 12. The torque bar 45 is, in turn, connected to the back rail 17 through a short helical spring 46 and L-fastener 47. The helical spring 46 is generally conventional in construction and hooks through a central aperture 48 formed in the outer end of the bar 45 and also through an aperture 49 formed in the inwardly extending end of the L-fastener 47. The L-fastener 47 hooks over the back rail 17 and is secured thereto by a conventional wood nail 50, for example.

The torque bar 45 according to the first embodiment of the present invention is best described by referring to FIGURE 5. The bar 45 is preferably formed by stamping or the like from a sheet of $\frac{1}{16}$ inch steel stock. The bar 45, as commercially produced, is one inch in width and 4½ inches long. It includes a depending lip 55 formed at the inner end and a downwardly canted ramp 56 formed at the outer end of a stepped central section 57. The central section 57 of the bar 45 is, in turn, composed of an upper portion 58 from which the lip 55 depends, and a lower portion 59 from which the canted tab 56 is inclined. The portions 58 and 59 being connected by a shoulder 60. To provide a stiffening influence to the bar 45, a stiffening rib 65 is formed between the longitudinally extending edges of the bar and extends substantially the length thereof, as will be noted. The rib 65 is formed in the stamping operation.

In the lower portion 59 of the bar 45, a plurality of upwardly oriented ears 70 are formed in a suitable manner. A first opposed set 71 of ears 70 is formed immediately adjacent the ramp 56. Approximately ½ inch further inwardly on the lower portion 59 of the bar 45, a second set 72 of the ears 70 is formed. Approximately ¾ of an inch further inwardly on the lower portion 59, a third set 73 of the ears 70 are formed. One or more sets of the ears 70, cooperating with the depending lip 55, ordinarily retain corresponding linear segments 25 (certain of the segments 35–41, for example) to connect the spring band 20 to the back rail 17 of the frame 12.

As has been pointed out, each of the spring band arrangements 11 illustrated in FIGURE 1 is set up with a torque arm arrangement 22 arranged slightly differently. This means, in essence, that the torque bar 45 itself is interconnected with the corresponding spring band 20 in a slightly different manner to provide greater or lesser torque influence on the band 20. As seen in the uppermost spring band arrangement 11 in FIGURE 1, for example, the lip 55 of the torque bar 45 is hooked over the fourth linear segment 38 of the spring band 20. In turn, the first linear segment 35 of the spring band is retained behind the upwardly extending third set 73 of ears 70 on the lower section 59 of the torque bar 45. At the same time, the third linear segment 37 rests on and is retained by the shoulder 60 in the torque bar 45.

According to the present invention, the torque arm arrangement 22 thus spreads its torque imparting influence over a substantial portion, the length of which encompasses four linear segments 25 in this instance, of the spring band 20. A highly desirable amount of torque is thus imparted to the spring band 20 with little strain on any single point in the band 20. At the same time, the longitudinal stress on the band 20 is taken up by not only the lip 55, but also the shoulder 60 of the bar, and the third set 73 of ears 70.

Where a lesser amount of torque imparted to the spring band 20 is desirable or, on the other hand, it is considered desirable to spread the stress on the spring band 20 over even a greater portion of the band, the torque bar 45 might be attached to the spring band 20 in the manner shown in one of the other arrangements illustrated in FIGURE 1. For example, in the lowermost illustration of spring band arrangement 11 in FIGURE 1, the lip 55 is retained on the seventh linear segment 41 of the spring band 20. The sixth linear segment 40 rests behind the shoulder 60 in the torque bar 45, and the fourth linear segment 38 is retained behind the third set 33 of the ears 70. Furthermore, the third linear segment 37 is retained behind the second set 72 of ears 70.

Intermediate mounting relationships of the torque bar 45 on the spring band 20 are illustrated in the spring band arrangements 11 disposed between the upper arrangement 11 and the lower arrangement 11 in FIGURE 1. Each provides a markedly different amount of torque imparted to the band 20 as would be expected. Each also distributes the torque and longitudinal stresses imparted to the band 20 over varying amounts of the band.

Referring now to FIGURES 2 and 4, the same torque bar 45 is shown incorporated in a slightly different spring band arrangement 111. In the spring band arrangement 111, the sinuous spring band 120 is of the expanded-loop type. In other words, the spring band 120 comprises linear segments 25 and semi-circular segments 126 wherein the semi-circular segments 126 have larger radii than those of the regular loop spring band 20 hereinbefore discussed. The end result is that the spring band 120 has its linear segments 25 spaced approximately 1½ times further apart than those in the regular loop band 20. It is significant to the present invention that the torque bar 45 embodying features of the first embodiment of the present invention is engineered to be readily used with all three loopings available; expanded loop sinuous bands 120, as well as with the regular loop spring bands 20, and with super loop bands (not shown), having even larger radii than expanded loop, and being approximately 4 times farther between linear segments than regular loop 20.

In FIGURES 2 and 4, the torque bar 45 is seen to have its depending lip 55 retained behind the fourth linear segment 138 of the expanded loop sinuous spring band 120. The first set 71 of ears 170 on the bar 45 are positioned to retain the first linear segment 135 of the band 120. The support provided by the first set 71 of ears 70 tends to spread the longitudinal stress applied to the spring band 120 over a substantial portion of the end of the spring band adjacent the back rail 17, much in the manner discussed in relation to the torque bar 45 used with regular loop sinuous spring bands 20.

It will also be seen in FIGURE 2 that a pair of diverging helical springs 175 connect the bar 45 to the back rail 17. They hook through aperture 176 in the ramp portion 56 of the bar 45, in bracketing relationship with the aperture 48. Two L-fasteners 47 are also used, of course. This arrangement adds lateral stability to the spring arrangement 111.

In FIGURES 6 and 7, a second embodiment of the torque arm arrangement embodying features of the present invention is illustrated generally at 122. The torque arm arrangement 122 will be seen to include a torque member 145 formed of bent wire. The torque member 145 is identical in many respects to the torque bar 45 hereinbefore discussed, with the exception that it is formed of a single piece of stiff, high strength steel wire.

As will be noted, the free ends 155 of the wire are bent downwardly to form a lip much like the lip 55 of the torque bar 45. The loop end 156 of the member 145 is bent downwardly much in the manner of the ramp portion 56. The legs 157 of the generally U-shaped wire form an upper portion 158, a lower portion 159, and a shoulder 160. The wire legs 157 are appropriately bent to form ears 170 in a first set 171, a second set 172, and a third set 173. The positioning of the sets 171–173 of ears 170 longitudinally of the wire member 145 is identical to that of the sets of ears 71–73 hereinbefore described in relation to the torque bar 45.

The torque member 145 is utilized in substantially identical fashion to the torque arm 45 hereinbefore discussed, as would be expected. It is illustrated in FIGURES 6 and 7 in cooperation with a regular loop sinuous band 20. The various linear segments 25 of the band 20 cooperate with the depending lip 155, the shoulder 160, and appropriate sets 171–173 of ears 170 exactly as they cooperate with corresponding components of the torque bar 45. Accordingly, further description of the torque member 145 is not thought to be necessary. Similarly to the torque bar 45, the torque member 145 is adaptable to use with expanded loop and super loop sinuous bands, as well as the regular loop sinuous bands 20 illustrated.

Referring now to FIGURES 8 and 9, a torque arm arrangement defining a third embodiment of the present invention is illustrated generally at 222. The torque arm arrangement 222 includes a torque bar 245 which is formed out of strip steel broadly in the same manner that the torque bar 45 is formed. It takes a slightly different form, however, as will be noted. The torque bar 245 includes a downwardly extending lip 255 and an arch-like flange 256 formed on opposite ends of a substantially planar central section 257 of the steel strip making up the torque bar 245. A pair of fingers 270 is formed upwardly from the central section 257 in bracketing relationship with the arch-like flange 256.

The lip 255 is adapted to hook over the fifth linear segment 39 of a regular loop band 20 while the fingers 270 overlie and retain the first linear segment 35. The first linear segment 35 is retained behind the generally up-standing segments 271 of the fingers 270 and, accordingly, the stress imparted longitudinally to the sinuous spring band 20 is distributed between the fifth linear segment 39 and the first linear segment 35, while the torque stress is distributed over the entire rear section of the sinuous spring band 20 made up by the first five linear segments thereof.

The torque bar 245 permits adjustability also, as should be recognized. For example, if the lip 255 is secured over the sixth linear segment 40, the first linear segment 35 will rest immediately adjacent the arch like flange 256. In such case, torque stresses are distributed over a greater portion of the sinuous spring band 20 at the expense of a certain amount of longitudinal support because the first linear segment 35 is not retained immediately behind other stop means, for example. The torque bar 245 is adaptable to use with expanded loop and super loop sinuous springs also, of course.

Turning now to FIGURE 10, yet a fourth embodiment of torque arm arrangement according to the present invention is illustrated generally at 322. The torque arm arrangement 322 includes a torque bar 345 which is somewhat shorter than the torque bar 45 defining the first embodiment of the present invention, as will be noted. It includes a downwardly extending lip 355 and an upwardly extending flange 356 formed at opposite ends of the generally flat central section 357, the central section 357 having a slight arch in it at 358. Pairs of upwardly extending ears 370 are formed in two sets 371 and 372 in the central section 357, much in the same manner illustrated with respect to the torque bar 45. The torque bar 345 is suited for use with regular loop sinuous springs, as illustrated, or with expanded loop spring bands or super loop bands, although it is not quite as versatile as the torque members hereinbefore discussed.

A fifth embodiment of the torque arm arrangement according to the present invention is illustrated generally at 422 in FIGURE 11. It includes a generally irregular L-shaped bar 445 which is adapted to be utilized in on-edge relationship, as illustrated. A series of three apertures 446, 447, and 448 are formed through the bar 445, the first two 446 and 447 spaced at a distance substantially equal to the distance between the linear segments 25 in a regular loop sinuous spring band 20. As illustrated at FIGURE 11, the first sinuous spring band linear segment 35 extends through the aperture 447, while the second linear element 36 extends through the first aperture 446.

The bar 445 applies torque and longitudinal stress to the band 20 much in the manner of the bar 345 hereinbefore discussed. If it is desirable to use expanded loop spring bands, the first linear segment thereof (135 in FIGURE 2) would extend through the aperture 448 rather than 447, as would be expected. The bar could be further apertured for super loop band, of course.

The outer end or foot 450 of the bar 445 has a vertically displaced series of apertures 451 formed in it, as will be noticed. They afford adjustability of the level of attachment of the bar 445 to a helical spring and, consequently, adjustability of torque stress applied to the spring band 20 (or 120).

Several embodiments of the present invention have been illustrated and described. Each has characteristics which assure optimum torque being imparted to a sinuous spring band. Furthermore, each facilitates torque adjustment. In addition, the present invention provides for distribution of the torque and longitudinal stresses imparted to the spring band over a relatively wide area thereof. In this light, it has been found that seating characteristics including comfort, etc. with de-arced sinuous bands as well as arced bands are enhanced considerably with the present invention, as compared with presently known torquing constructions, that is.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a sinuous spring band arrangement for use in a furniture frame or the like, the combination of: a sinuous spring band having a series of linear segments interconnected by a series of generally semi-circular segments, and a torque member pivotally mounted with respect to one rail of the frame and cooperating with said band for connecting one end of said band to the rail, said torque member exerting a downward pressure on one of said linear segments and exerting an upward pressure on another of said linear segments spaced toward said rail a span of at least two of said semi-circular segments from said one linear segment.

2. In a sinuous spring band arrangement for use in a furniture frame or the like, the combination of: a sinuous spring band having a series of linear segments interconnected by a series of generally semi-circular segments, and a torque member pivotally mounted with respect to one rail of the frame and cooperating with said band for connecting one end of said band to the rail, said torque member overlying one of said linear segments and underlying the last of said linear segments on said one end of said spring band, said last linear segment being spaced toward said rail a span of at least two of said substantially semi-circular segments from said one linear segment.

3. The combination of claim 2 further characterized in that said torque member includes downwardly extending means formed adjacent one end thereof for retaining said one linear segment, and upwardly extending means for retaining at least one other linear segment.

4. In a sinuous spring band arrangement for use in a furniture frame or the like, the combination of: a sinuous spring band having a series of linear segments interconnected by a series of generally semi-circular segments, and a torque member for connecting one end of said band to the frame, said torque member overlying one of said linear segments and underlying another of said linear segments, said torque member having a plurality of longitudinally displaced ear means thereon extending upwardly therefrom, said ear means adapted to retain at least one of said linear segments and prevent relative displacement of said spring band and said torque member from substantially longitudinal alignment.

5. The combination of claim 4 further characterized in that said longitudinally displaced ear means comprises a longitudinally spaced series of laterally spaced ears on said torque member.

6. The combination of claim 5 further characterized in that said torque member has three sets of ear means extending upwardly therefrom, two of said sets of ear means cooperating with said linear segments in varying types of spring bands.

7. A sinuous spring band assembly for use in a spring construction including a frame, said assembly comprising: a sinuous spring band including a series of linear segments interconnected by a series of generally semi-circular segments and having a substantially arcuate normal configuration, connector means for connecting one end of said spring band to the frame, said connector means including an elongated torque member having an outer end pivotally mounted with respect to the frame, said torque member having retainer means adjacent its inner end for hooking over one of said linear segments and subtending an arc of said spring band to underlie another of said linear segments displaced toward said frame a span of at least two of said substantially semi-circular segments from said one linear segment, whereby said torque member reaches into the interior of said spring band to retain and apply torque to said spring band in its weight supporting area.

8. The sinuous spring band assembly of claim 7 further characterized by and including upstanding ear means on said torque member for longitudinally retaining one of said linear elements and for preventing relative angular displacement of said spring band and said torque member from substantially longitudinal alignment.

9. The sinuous spring band assembly of claim 7 further characterized by and including ramp means extending downwardly at an angle from the other end of said elongated torque member, whereby initial torque is applied to said spring band.

10. The sinuous spring band assembly of claim 8 further characterized by and including a longitudinally spaced series of laterally displaced pairs of ears on said torque member for longitudinally retaining the linear elements and for preventing relative angular displacement of said spring band and said torque member from substantially longitudinal alignment.

11. The sinuous spring band assembly of claim 8 further characterized by and including shoulder means formed in said torque member adjacent said retainer means for longitudinally retaining one of the linear elements therebehind.

12. In a connector assembly for securing one end of a sinuous spring band to the rail of a frame wherein the band includes a series of linear segments interconnected by a series of generally semi-circular segments, a torque member comprising: an elongated body having a generally flat central section, an outer end section depending at an angle from said central section and having means formed therein for connecting said member to a rail, and an inner end section offset upwardly from said central section, said inner end section having lip means formed therein for overlying and retaining one of the linear segments in the spring band, and ear means extending upwardly from said central section for retaining other of the linear segments.

13. The torque member of claim 12 further characterized by and including shoulder means formed in said elongated body between said central section and said inner end section for retaining one of the linear segments in the spring band.

14. The torque member of claim 12 further characterized in that said ear means includes a longitudinally spaced series of laterally displaced pairs of ears formed upwardly from the material of said body.

15. The torque member of claim 14 further characterized by and including a stiffening rib formed in said body and extending longitudinally thereof between laterally displaced ears.

16. In a sinuous spring band arrangement for use in a furniture frame or the like, the combination of: a sinuous spring band of predetermined length extending between oppositely disposed front and back rails of the frame for supporting a seated subject with the bulk of his weight concentrated in an area between the middle and the rear end of the spring band, said spring band including a series of linear segments interconnected by a series of generally semi-circular segments, and a torque member pivotally mounted with respect to said back rail and cooperating with said band for connecting said rear end of said band to the back rail, said torque member exerting a downward pressure on one of said linear segments and an upward pressure on another of said linear segments spaced a span of at least two of said semi-circular segments from said one linear segment toward said back rail, whereby said downward pressure is exerted at a point well into the body of said band in said area of greatest supported weight.

References Cited by the Examiner

UNITED STATES PATENTS 2,593,831  4/52  Bank ---------------- 267—111
3,098,244  7/63  Rothbauer ------------ 5—247
3,098,646  7/63  Knabusch et al. -------- 267—112

ARTHUR L. LA POINT, *Primary Examiner.*